(12) United States Patent
Rinklin

(10) Patent No.: US 8,191,944 B2
(45) Date of Patent: Jun. 5, 2012

(54) BUMPER ATTACHMENT, BUMPER ARRANGEMENT AND MOTOR VEHICLE

(75) Inventor: Gerhard Rinklin, Tiefenbronn (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/185,761

(22) Filed: Jul. 19, 2011

(65) Prior Publication Data

US 2012/0013137 A1    Jan. 19, 2012

Related U.S. Application Data

(60) Provisional application No. 61/368,800, filed on Jul. 29, 2010.

(30) Foreign Application Priority Data

Jul. 19, 2010    (DE) .......................... 10 2010 036 475

(51) Int. Cl.
*B60R 19/22*    (2006.01)

(52) U.S. Cl. .......................... 293/142; 293/102; 40/209

(58) Field of Classification Search .................. 293/142, 293/102; 40/209
See application file for complete search history.

(56) References Cited

U.S. PATENT DOCUMENTS

| 5,711,562 A * | 1/1998 | Terada et al. ................. 293/120 |
| 6,167,645 B1 * | 1/2001 | Gasko et al. .................... 40/200 |
| 2006/0156595 A1 * | 7/2006 | Kasak et al. .................... 40/209 |
| 2006/0191173 A1 | 8/2006 | Levine |

FOREIGN PATENT DOCUMENTS

| DE | 82 06 078 | 5/1982 |
| DE | 94 09 508 | 9/1994 |
| DE | 94 16 113 | 12/1994 |
| FR | 2 789 955 | 8/2000 |

* cited by examiner

*Primary Examiner* — Joseph Pape

(74) *Attorney, Agent, or Firm* — Gerald E. Hespos; Michael J. Porco

(57) ABSTRACT

A bumper attachment (1) for a motor vehicle (3) has: a base attachment part (4) with a front side (5) for installation of a license plate (8) and a rear side (6) for installation of the bumper attachment (1) in a license plate trough (2) of the motor vehicle (3). At least one impact protection element (9, 10) extends from the front (5) of the base attachment part (4) and has a reinforcing insert (11, 12) and a receiving section (13, 14) for receiving the reinforcing insert (11, 12).

12 Claims, 6 Drawing Sheets

BUMPER ATTACHMENT, BUMPER ARRANGEMENT AND MOTOR VEHICLE

CROSS-REFERENCE TO RELATED APPLICATIONS

This application claims priority under 35 USC 119 to German Patent Application No. 10 2010 036 475.4 filed on Jul. 19, 2010 and U.S. Provisional Patent Appl. No. 61/368,800 filed on Jul. 29, 2010, the entire disclosures of which are incorporated herein by reference.

BACKGROUND OF THE INVENTION

1. Field of the Invention

The invention relates to a bumper attachment for a motor vehicle, to a bumper arrangement with a bumper attachment of this type, and to a motor vehicle with a bumper arrangement of this type. The invention and the problem addressed by the invention are explained in detail with reference to a passenger vehicle, but are applicable to any vehicle.

2. Description of the Related Art

A bumper attachment on a bumper covering part of a motor vehicle functions to receive and fasten a license plate and to protect the vehicle from damage, for example, during parking operations. US 2006/0156595 A1 describes a bumper attachment with a plate-like license plate holder and hard rubber buffers extending vertically on both sides of the license plate for shock absorption. Furthermore, US 2006/0191173 A1 describes a bumper attachment with a tubular shock protection device extending in a semicircular manner in front of a license plate receiving region of the bumper attachment. DE 82 06 078 U1 describes shock protection for a bumper consisting of foamed plastics material. The shock protection has a base plate for the fastening of a license plate, with raised, profiled edge regions, which preferably have stiffening ribs. The above-mentioned bumper attachments can absorb deformation energy to a certain extent. However, during low speed crash, these known bumper attachments are unsuitable for conducting the energy that occurs into the motor vehicle bumper crash structures located behind the covering part and will incur damage.

The invention therefore is based on the object of providing improved bumper impact protection that eliminates the abovementioned disadvantage and is produced with the simultaneous aim of a visually attractive appearance while being economical in terms of costs and with weight-minimized components.

SUMMARY OF THE INVENTION

A bumper attachment for a motor vehicle in accordance with the invention has a base attachment part with a front side for installation of a license plate and a rear side for installation in a license plate trough of the motor vehicle. At least one impact protection element extends from the front side of the base attachment part and has a reinforcing insert and a receiving section for receiving the reinforcing insert.

The invention also relates to a bumper arrangement for a motor vehicle. The bumper arrangement may include the above-described bumper attachment that is fit on an outer side of the license plate trough. At least one support supports the license plate trough in relation to a bumper cross member of the motor vehicle. The at least one support may be fit on an inner side of the license plate trough.

The invention involves providing a reinforcing insert that is received in a receiving section of the base attachment part. The reinforcing insert is capable of conducting energy occurring in the event of a crash to a crash structure of the vehicle, for example via a support.

The receiving section preferably is an integral part of the base attachment part. Thus, the bumper attachment can be produced simply, expediently and cost-effectively.

The receiving section preferably is an arching of the base attachment part with an interior space that is open at least in sections toward the rear side of the base attachment part for receiving the reinforcing insert. Thus, the reinforcing insert can be inserted rapidly and securely into the receiving section so that the manufacturing costs of the bumper attachment are kept low.

Installation elements preferably are provided on the rear of the base attachment part for the form-fitting connection of the reinforcing insert in the receiving section.

The installation elements preferably are integral parts of the base attachment part and preferably are spring clips. The integral installation elements advantageously reduces the number of components required for preassembling the bumper attachment and considerably reduces manufacturing costs.

The front of the base attachment part preferably has a license plate receiving region for receiving the license plate. An impact protection element preferably is arranged on either side of the license plate receiving region for reliably protecting the license plate from damage.

The front and rear of the base attachment part preferably have supports, such as supporting ribs. The supports increase the rigidity and prevent flapping of the base attachment part as the motor vehicle is being driven.

The reinforcing insert preferably has fastening means, such as fastening spikes, for fastening the bumper attachment in the license plate trough, for example on a bumper covering of the motor vehicle. This fastening means simplifies the installation of the bumper attachment in the license plate trough of the motor vehicle without having an adverse effect on the visual effects of the visible side of the base attachment part.

The reinforcing insert may have a lattice structure to increase the rigidity of the reinforcing insert while simultaneously reducing weight and saving on material.

The base attachment part and the reinforcing insert may be formed from different materials. For example, the base attachment part may be formed from a lightweight, reasonably priced UV-resistant plastics material, and the reinforcing insert may be formed from a cost-effective, light and impact-resistant injection molding or metal casting. Thus, the mechanical properties of the bumper attachment can adapt to the requirements.

The at least one support may be a hooking-behind means and/or clipping means, and preferably is connected in a form-fitting and/or frictional manner to the at least one impact protection element, such as the reinforcing insert. Thus, the base attachment part cannot detach and has favorable costs and weight for production and preassembly.

The invention is explained in more detail below using exemplary embodiments with reference to the attached schematic figures of the drawing.

DETAILED DESCRIPTION OF THE PREFERRED EMBODIMENTS

The same reference numbers refer to identical or functionally identical components in the figures unless otherwise stated.

Figure 1:
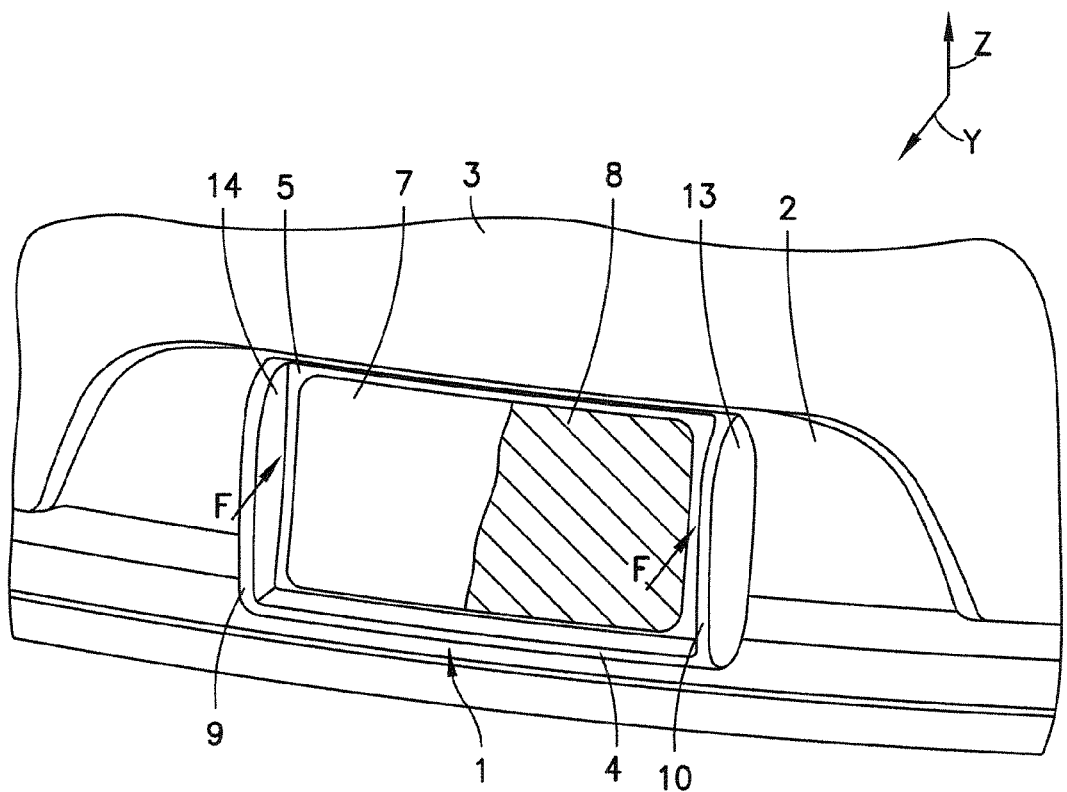
FIG. 1 is a three-dimensional view of a preferred embodiment of a bumper attachment.

The bumper attachment 1 of FIG. 1 is fit in a license plate trough 2 of a motor vehicle 3, for example in a rear region of the motor vehicle 3.

Figure 2:
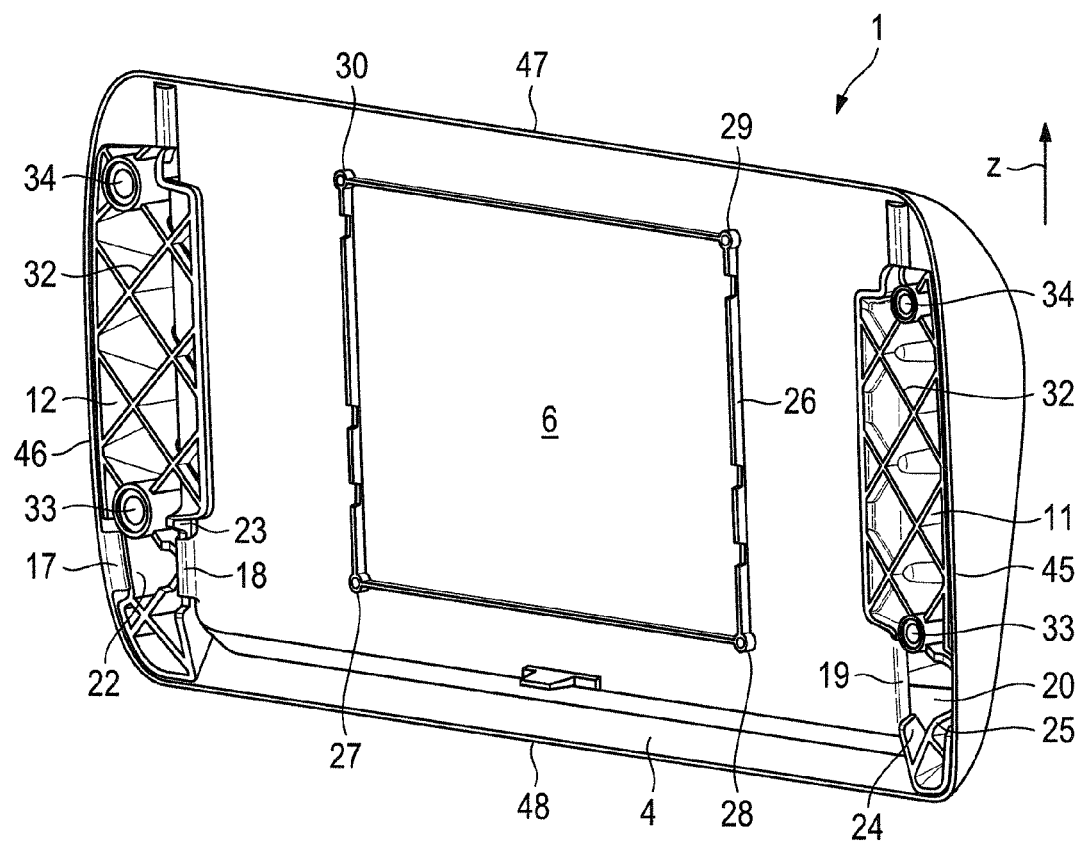
FIG. 2 is another three-dimensional view of the bumper attachment of FIG. 1.

The bumper attachment 1 has a plate-like, rectangular base attachment part 4 with in each case two short sides 45, 46, two longitudinal sides 47, 48, a front 5 and a rear 6 (FIG. 2). The rear 6 faces the license plate trough 2. In alternate embodiments, the base attachment part 4 has for example, a square, round or oval shape or any two-dimensional geometrical shape. The front 5 has a license plate receiving region 7 for receiving a license plate 8. FIG. 1 shows only part of the license plate 8 (illustrated with hatching) for improved illustration of the license plate receiving region 7. The license plate receiving region 7 is a depression in the front 5 of the base attachment part 4. The depression has a shape complementary to an external geometry of the license plate 8. The license plate receiving region 7 preferably is arranged substantially centrally on the front 5. The license plate 8 may have any two-dimensional shape. The license plate 8 is screwed, clipped, adhesively bonded or connected in any frictional, material-bonding and/or form-fitting manner to the license plate receiving region 7. The license plate 8 may be designed as a metal sheet, plastics plate, adhesive film or as a combination of these embodiments.

Figure 3:
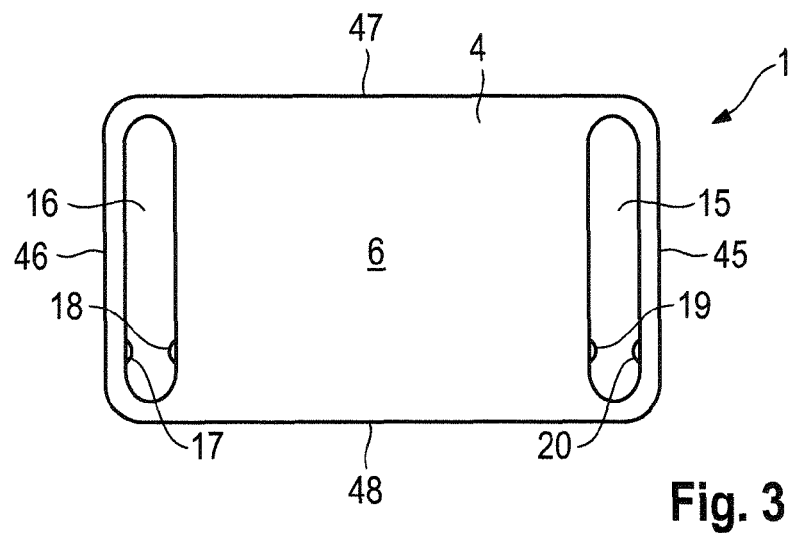
FIG. 3 is a rear view of the bumper attachment of FIG. 1.

At least one impact protection element 9, 10 extending from the front side 5 of the base attachment part 4. However, the bumper attachment 1 preferably has two impact protection elements 9, 10 that preferably are oriented approximately parallel to a vertical axis z of the motor vehicle 3 and are arranged on both sides vertically next to the license plate receiving region 7. More particularly, the impact protection elements 9, 10 preferably are arranged parallel to the short sides 45, 46 of the base attachment part 4 on both sides of the license plate receiving region 7. The impact protection elements 9, 10 preferably each have a reinforcing insert 11, 12 received in respective receiving sections 13, 14 of the impact protection elements 9, 10. The receiving sections 13, 14 preferably are integral parts of the base attachment part 4. For example, the receiving sections 13, 14 are designed as archings of the base attachment part 4 in the direction of the front 5 of the base attachment part 4, with the receiving sections 13, 14 each forming an interior space 15, 16 (FIG. 3) that is open at least in sections toward the rear 6 of the base attachment part 4, for receiving one reinforcing insert 11, 12 each. A cross section of the impact protection elements 9, 10 preferably tapers in a longitudinal direction y of the motor vehicle 3, starting from the front 5 of the base attachment part 4.

Installation elements 17 to 20 preferably are provided on the rear 6 of the base attachment part 4 for the form-fitting fixing of the respective reinforcing inserts 11, 12 in the receiving sections 13, 14 of the base attachment part 4. The installation elements 17 to 20 preferably are integral parts of the base attachment part 4 and preferably are clips 17 to 20. The clips 17 to 19, for example, are projections that project into the interior spaces 15, 16. Each reinforcing insert 11, 12 is pushed by the upper ends thereof into a pocket of the receiving sections 13, 14. The reinforcing inserts 11, 12 may be inserted into the respective receiving sections 13, 14 of the base attachment part 4 to interact with the clips 17 to 19. For example, the clips 17 to 20 may have bevels that snap over corresponding mating engagement sections 22 to 25 on the reinforcing inserts 11, 12 to fix the reinforcing elements 11, 12 in a form-fitting manner in the respective receiving sections 13, 14. The clips 17 to 20 may be provided in an end section of the particular receiving sections 13, 14. As an alternative, the clips 17 to 20 may be arranged centrally or in both end sections of the receiving sections 13, 14. Furthermore, more than four clips, for example, eight clips, may be provided per receiving section 13, 14.

A supporting rib 26 preferably is provided on the rear 6 of the base attachment part 4. The supporting rib 26 functions to support the rear 6 of the base attachment part 4 on the license plate trough 2 of the motor vehicle 3 and to stiffen the base attachment part 4. The supporting rib 26 also functions to position the bumper attachment 1 in the license plate trough 2 along the transverse direction Y and vertical direction Z of the vehicle. The supporting rib 26 preferably is a square that extends from the rear 6 of the base attachment part 4 in the direction of the license plate trough 2. The supporting rib 26 preferably is arranged approximately centrally on the rear 6. Fastening points 27 to 30 preferably are provided in the corners of the square shape of the supporting rib 26 for installing the license plate 8 from the front 5 of the base attachment part 4. The fastening points 27 to 30 may be cylinders each having a central bore. Alternatively, the supporting rib 26 may define an X that is mounted between corners of the rectangular shape of the base attachment part 4. The base attachment part 4 preferably is formed from a light, cost-effective UV-resistant material. Depending on crash requirements, an impact-resistant plastics material also may be used. The base attachment part 4 may be formed by a plastics injection molding process.

Figure 4:
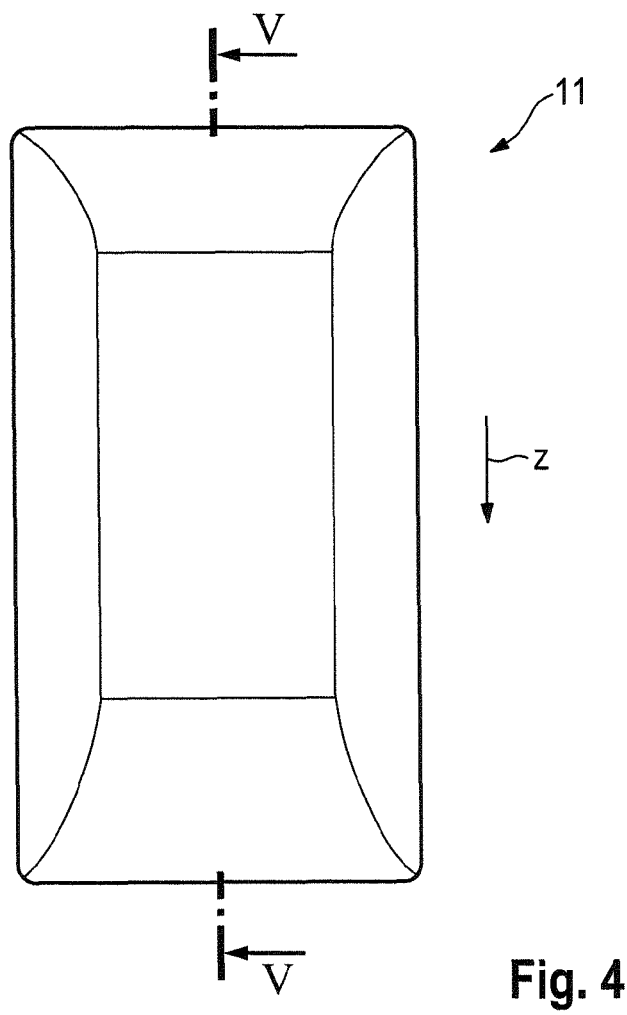
FIG. 4 is a top view of a reinforcing insert of the bumper attachment of FIG. 1.
Figure 5:
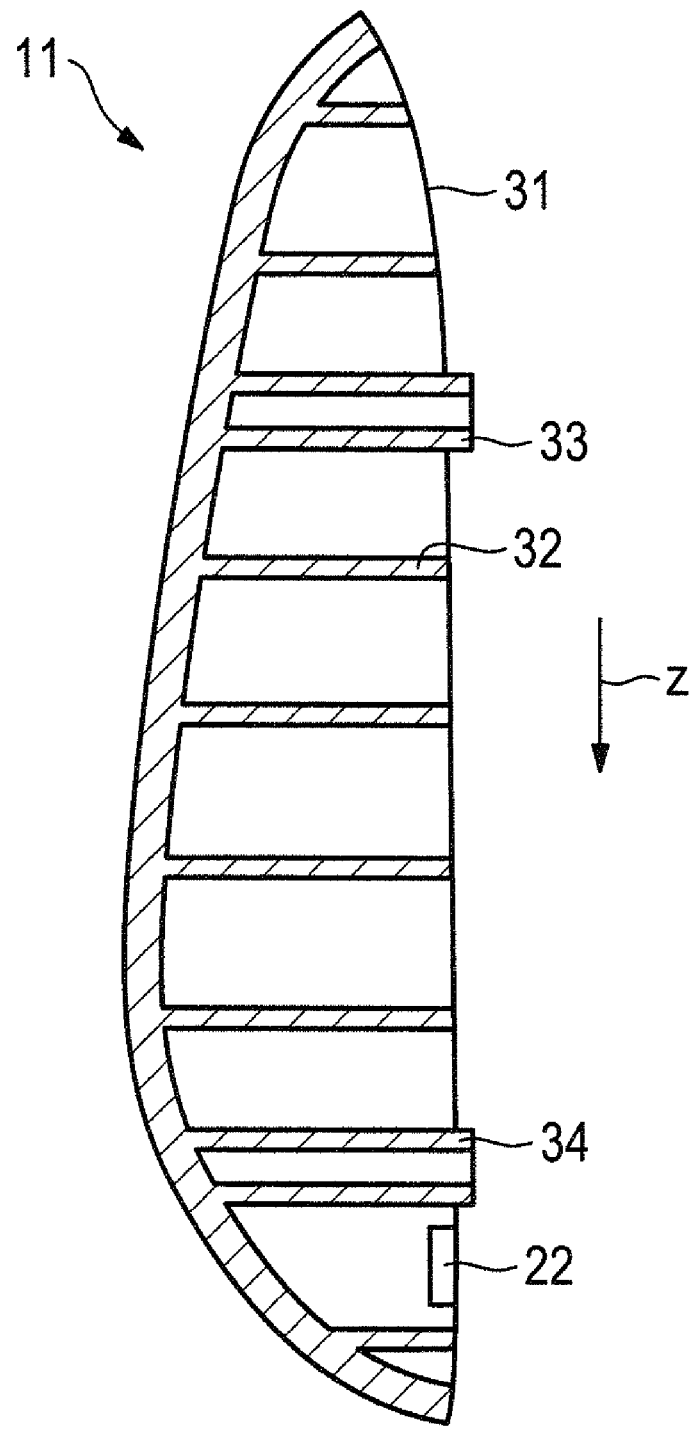
FIG. 5 is a sectional view taken along line V-V of FIG. 4.

As illustrated in FIG. 4, the reinforcing inserts 11, 12 have an approximately rectangular shape with highly rounded edges in top view. In section (FIG. 5), the reinforcing inserts 11, 12 have a rounded shape that preferably complements a contour of the interior spaces 15, 16 of the receiving sections 13, 14 opposite an approximately flat rear 31, which is approximately parallel to the rear 6 of the base attachment part 4 and so as to face the license plate trough 2. The reinforcing inserts 11, 12 preferably have an interior, ribbed lattice structure 32. Furthermore, the reinforcing inserts 11, 12 each have fasteners 33, 34, such as fastening spikes 33, 34 for fastening the bumper attachment 1 or the respective reinforcing inserts 11, 12 in the license plate trough 2 of the motor vehicle 3. The reinforcing inserts 11, 12 preferably are formed from a high-strength material, for example an impact-resistant plastics material or a metal alloy, such as an aluminum or magnesium alloy. Alternatively, the base attachment part 4 and the reinforcing inserts 11, 12 are formed from the same material. The mating engagement sections 22 to 25 are provided on the rear 31 of the reinforcing insert 11, 12.

Figure 6:
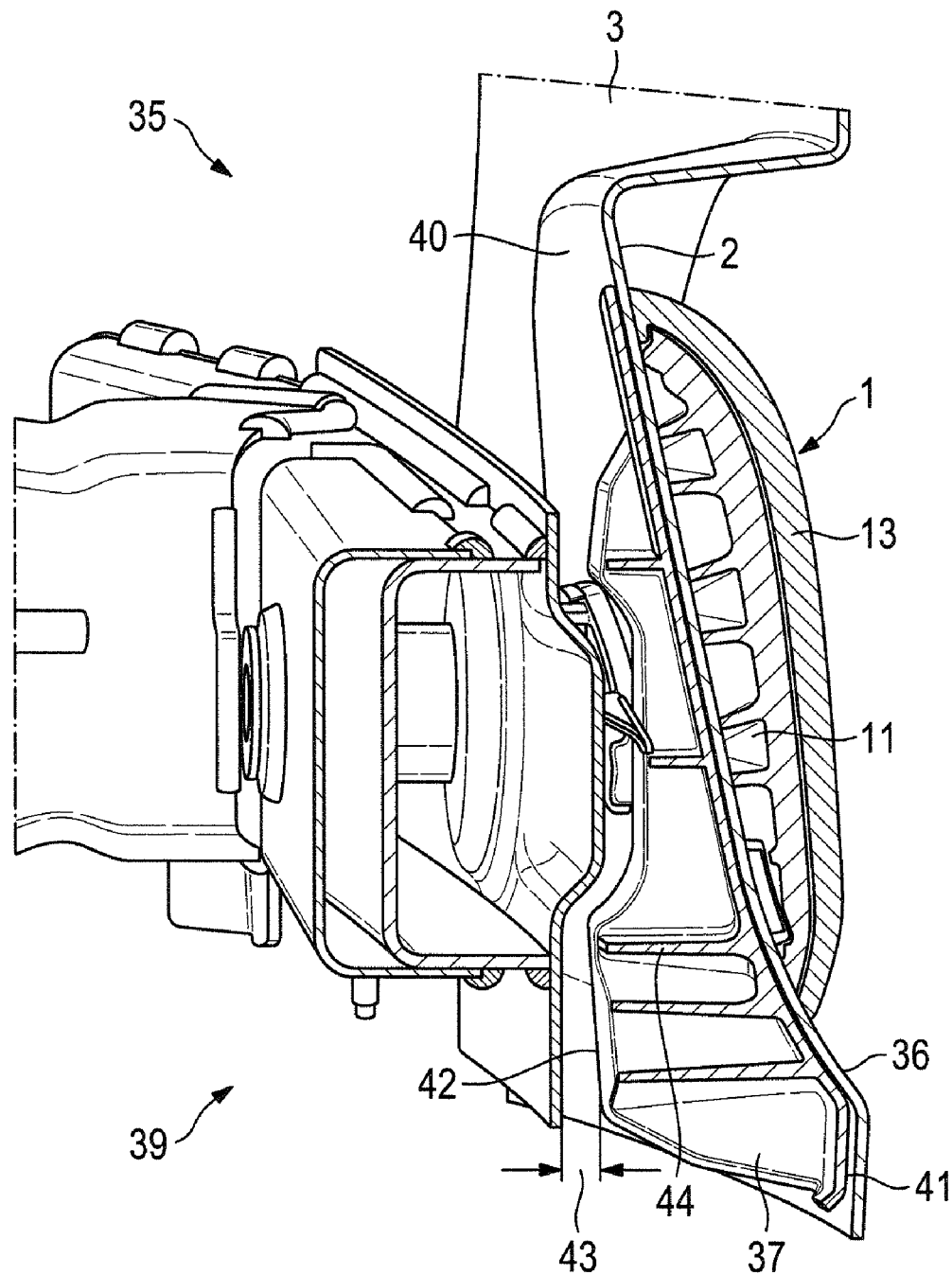
FIG. 6 is a perspective view of a bumper arrangement.
Figure 7:
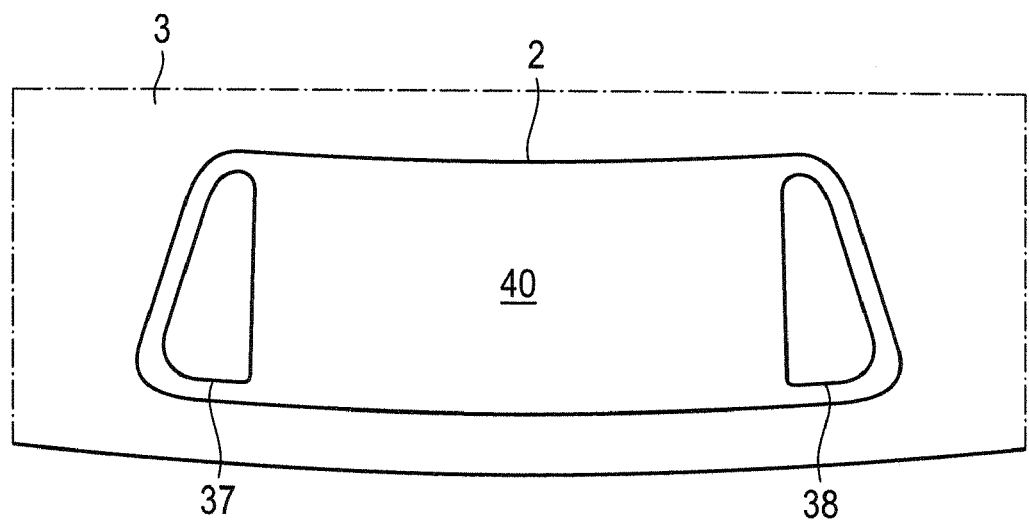
FIG. 7 is a rear view of a license plate trough to which the bumper attachment of FIG. 1 is fit.

FIG. 6 illustrates a preferred embodiment of a bumper arrangement 35 with a bumper attachment 1 that is fit on an outer side 36 of the license plate trough 2. The bumper arrangement 35 is provided, for example, in a rear region of the motor vehicle 3 and has at least one support 37, 38, but preferably two supports 37, 38, for supporting the license plate trough 2 and the bumper attachment 1 in relation to a bumper cross member arrangement 39. In this case, the supports 37, 38 preferably are fit on an inner side 40 of the license plate trough 2 (FIG. 7). The supports 37, 38 each have a front 41 that faces the inner side 40 of the license plate trough 2 and preferably is shaped in a complementary manner with respect thereto. Furthermore, the supports 37, 38 preferably have a rear side 42 that faces the bumper cross member arrangement 39 and is shaped in a complementary manner with respect thereto. The supports 37, 38 preferably are formed with a high-strength material, such as an impact-resistant plastics material or a metal alloy. A tolerance spacing 43 preferably is provided between the rear 42 of the supports 37, 38 and the bumper cross member arrangement 39. The tolerance spacing 43 has, for example, a size of approximately 10 mm. The bumper cross member arrangement 39 is designed so that, in an assembly with the bumper attachment 1 and the supporting elements 37, 38, the bumper cross member arrangement converts kinetic energy, for example in the event of a crash of the motor vehicle 3, into deformation energy. The supports 37, 38 preferably have a lattice structure 44 for reducing weight and increasing rigidity. The supports 37, 38 preferably are connected in a form-fitting and/or frictional manner to the respective associated impact protection elements 9, 10, in particular to the respective reinforcing inserts 11, 12 of the bumper attachment 1, such as by a screw or clip fixing connection via the fastening spikes 33, 34.

In the event of a crash of the motor vehicle 3, a force F acts on the bumper attachment 1. The force F is introduced into at least one of the impact protection elements 9, 10 or into the respective receiving sections 13, 14. The force F is transmitted from there via the respective reinforcing inserts 11, 12 to the license plate trough 2 and from their to the respective support 37, 38. After the tolerance spacing is overcome, for example by elastic deformation of the license plate trough 2, the supports 37, 38 rest on the bumper cross member arrangement 39. Up until then, the bumper attachment 1 and the supporting elements 37, 38 have only absorbed a very small amount of deformation energy, if any at all. The entire force F therefore is introduced into the bumper cross member arrangement 39 and is converted there in a controlled manner into deformation energy.

What is claimed is:

1. A bumper attachment for a motor vehicle, comprising: a base attachment part with a front face for installation of a license plate and a rear face for installation of the bumper attachment in a license plate trough of the motor vehicle; at least one impact protection element extending from the front face of the base attachment part and defining a receiving section; a reinforcing insert received in the receiving section; and installation elements on the rear face of the base attachment part for a form-fitting fixing of the reinforcing insert in the receiving section.

2. The bumper attachment of claim 1, wherein the receiving section is an integral part of the base attachment part.

3. The bumper attachment of claim 2, wherein the receiving section defines an arching unitary with the base attachment part and forming an interior space that is rearwardly concave and open at least in sections in the rear face of the base attachment part for receiving the reinforcing insert.

4. The bumper attachment of claim 1, wherein the installation elements are clips unitary with the base attachment part.

5. The bumper attachment of claim 1, wherein the front face of the base attachment part has a license plate receiving region for receiving the license plate, and the at least one impact protection element comprises at least two impact protection elements arranged on opposite sides of the license plate receiving region.

6. The bumper attachment of claim 1, further comprising supporting elements on the rear face of the base attachment part.

7. A bumper attachment for a motor vehicle, comprising: a base attachment part with a front face for installation of a license plate and a rear face for installation of the bumper attachment in a license plate trough of the motor vehicle; and at least one impact protection element extending from the front face of the base attachment part and defining a receiving section; and a reinforcing insert received in the receiving section, wherein the reinforcing insert has fastening spikes for fastening the bumper attachment in the license plate trough of the motor vehicle.

8. The bumper attachment of claim 1, wherein the reinforcing insert has a lattice structure.

9. The bumper attachment of claim 1, wherein the base attachment part and the reinforcing insert are formed from different materials.

10. A bumper arrangement for a motor vehicle, comprising: a bumper attachment having a base attachment part with a front face for installation of a license plate and a rear face for installation in a license plate trough of the motor vehicle; at least one impact protection element extending from the front face of the base attachment part and defining a receiving section; a reinforcing insert received in the receiving section, installation elements on the rear face of the base attachment part for a form-fitting fixing of the reinforcing insert in the receiving section, the bumper attachment being fit on an outer side of the license plate trough; and at least one supporting element for supporting the license plate trough in relation to a bumper cross member of the motor vehicle, the at least one supporting element being fit on an inner side of the license plate trough.

11. The bumper arrangement of claim 10, wherein the at least one supporting element and the license plate trough are configured to nest with the reinforcing insert.

12. A motor vehicle, comprising the bumper arrangement of claim 10.

* * * * *